(12) United States Patent
Varma et al.

(10) Patent No.: US 11,295,334 B2
(45) Date of Patent: Apr. 5, 2022

(54) BATCH TRANSACTION MULTIPLEXING ENGINE

(71) Applicant: Bank of America Corporation, Charlotte, NC (US)

(72) Inventors: Jayachandra Varma, Irving, TX (US); Gopikrishna Nemalikanti, Frisco, TX (US); Manu Kurian, Dallas, TX (US); Saritha Vrittamani, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 16/399,263

(22) Filed: Apr. 30, 2019

(65) Prior Publication Data
US 2020/0349602 A1 Nov. 5, 2020

(51) Int. Cl.
*G06Q 30/00* (2012.01)
*G06Q 30/02* (2012.01)
(Continued)

(52) U.S. Cl.
CPC ......... *G06Q 30/0235* (2013.01); *G06N 20/00* (2019.01); *G06Q 20/40* (2013.01)

(58) Field of Classification Search
CPC ........... G06Q 30/0207; G06Q 30/0208; G06Q 30/0222; G06Q 30/0235; G06Q 30/0239; G06Q 40/04; G06Q 40/06; G06N 20/00
See application file for complete search history.

(56) References Cited

U.S. PATENT DOCUMENTS

| | | | |
|---|---|---|---|
| 5,121,945 | A | 6/1992 | Thomson et al. |
| 5,920,848 | A | 7/1999 | Schutzer et al. |

(Continued)

FOREIGN PATENT DOCUMENTS

| | | | |
|---|---|---|---|
| CN | 103744521 A | * | 4/2014 |
| KR | 20090066019 A | * | 11/2009 |

(Continued)

OTHER PUBLICATIONS

Ma; Algorithm-Hardware_Co-Design_of_Single_Shot_Detector_for_Fast_Object_Detection_on_FPGAs; ACM 2018; pp. 8; 2018.*

(Continued)

*Primary Examiner* — Radu Andrei
(74) *Attorney, Agent, or Firm* — Weiss & Arons LLP

(57) ABSTRACT

Systems and methods for batch multiplexing a plurality of transactions are provided. A system may include a machine-learning ("ML") based engine configured to receive instructions to execute a first transaction, derive a plurality of sets of delay parameters for the first transaction, and display the sets of delay parameters on a graphical user interface ("GUI") associated with a sender of the instructions. The engine may be configured to receive a selection of a set of delay parameters, and, based on the selection, append the first transaction to one of a plurality of pending transaction queues. The engine may be further configured to, within a maximum time window, combine the transactions in the pending transaction queue to create a single multiplexed transaction, and execute the multiplexed transaction. The engine may also be configured to demultiplex the multiplexed transaction after it is executed.

19 Claims, 6 Drawing Sheets

400

(51) Int. Cl.
*G06Q 20/40* (2012.01)
*G06N 20/00* (2019.01)

(56) References Cited

U.S. PATENT DOCUMENTS

| | | | |
|---|---|---|---|
| 7,590,595 | B2 | 9/2009 | Pessin |
| 7,801,814 | B2 | 9/2010 | Cataline et al. |
| 8,239,310 | B2 | 8/2012 | Lortscher, Jr. |
| 8,626,617 | B1 | 1/2014 | Bhatt |
| 2007/0133603 | A1* | 6/2007 | Weaver ............... H04L 43/16 370/468 |
| 2008/0300997 | A1* | 12/2008 | Dawson ............ G06Q 20/367 705/14.1 |
| 2009/0154475 | A1* | 6/2009 | Lautenschlaeger ... H04L 47/627 370/400 |
| 2010/0274630 | A1 | 10/2010 | Newman et al. |
| 2011/0299544 | A1* | 12/2011 | Lundgren ............ H04L 65/40 370/401 |
| 2013/0046598 | A1* | 2/2013 | Roberts ............. G06Q 30/0605 705/14.23 |
| 2013/0080180 | A1* | 3/2013 | Foladare ........... G06Q 30/0601 705/1.1 |
| 2013/0262287 | A1* | 10/2013 | Parsons ................ G06Q 40/04 705/37 |
| 2014/0129315 | A1* | 5/2014 | Neely ............... G06Q 30/0207 705/14.35 |
| 2014/0164586 | A1* | 6/2014 | Dankberg .......... G06Q 30/0207 709/223 |
| 2014/0207550 | A1 | 7/2014 | Eden et al. |
| 2015/0081491 | A1 | 3/2015 | Brereton et al. |
| 2016/0300279 | A1* | 10/2016 | Ahmed ............... G06F 16/9535 |
| 2018/0191624 | A1* | 7/2018 | Haynold ............ H04L 43/0852 |

FOREIGN PATENT DOCUMENTS

| | | | | |
|---|---|---|---|---|
| KR | 20130046598 | A | * | 5/2013 |
| KR | 20130080180 | A | * | 10/2013 |
| KR | 20140129315 | A | * | 10/2014 |
| KR | 101523965 | B1 | * | 7/2015 |
| KR | 20150006601 | A | * | 9/2015 |
| KR | 20150062968 | A | * | 10/2015 |
| KR | 20160062990 | A | * | 1/2016 |
| KR | 20160037342 | A | * | 8/2016 |
| KR | 20170011084 | A | * | 4/2017 |
| KR | 20180074320 | A | * | 3/2018 |
| WO | WO-2018117735 | A1 | * | 6/2018 ............ B21B 15/00 |

OTHER PUBLICATIONS

Vermer; Scheduling_periodic_real-time_communication_in_multi-GPU_systems; IEEE; 8 pages; 2014.*

* cited by examiner

BATCH TRANSACTION MULTIPLEXING ENGINE

FIELD OF TECHNOLOGY

Aspects of the disclosure relate to digital systems. Specifically, aspects of the disclosure relate to systems and methods for processing transactions within digital transaction systems.

BACKGROUND OF THE DISCLOSURE

Digital systems are commonly used to process and execute transactions. The transactions may include purchases, sales, trades, and other suitable transactions that may be processed and executed electronically. Electronic processing and executing of transactions may provide increased speed, efficiency, and security over non-electronic processes.

Electronic processing and executing of transactions, however, may be associated with various costs. The costs may include resource utilization. The resources may facilitate digital processing, storage, transmission, and other services associated with processing and executing the transactions. Resource utilization may, in turn, be associated with financial costs to a processing entity and/or to one or more transacting parties.

It would be desirable, therefore, to provide systems and methods for electronically processing and executing transactions. It would be further desirable for the electronic systems and methods to reduce the resource utilization and costs associated with processing and executing the transactions.

SUMMARY OF THE DISCLOSURE

Aspects of the disclosure relate to systems and methods for batch multiplexing a plurality of transactions. A method may include receiving an instruction to execute a first transaction. The method may include deriving for the first transaction, via a processing engine, an incentive value for each of a plurality of pending transaction queues. Each pending transaction queue may be associated with one of a plurality of maximum time windows.

Deriving the incentive value for a pending transaction queue may be based at least in part on a size of the first transaction, a number and/or size of other transactions that are in the pending transaction queue, and a number and/or size of other transactions that are expected to join the pending transaction queue based on predictive analytics. The predictive analytics may be performed via a machine-learning ("ML") component of the processing engine.

The method may include receiving an authorization to delay the first transaction via a graphical user interface ("GUI") of a computing device associated with a sender of the instruction. The method may also include receiving a selection of one of the pending transaction queues via the GUI.

The method may also include applying the incentive value derived for the selected pending transaction queue to the first transaction. The method may further include appending the first transaction to the selected pending transaction queue.

The method may also include combining, prior to the termination of the maximum time window of the selected pending transaction queue, the transactions in the selected pending transaction queue. Combining the transactions may create a single multiplexed transaction. The method may further include executing the multiplexed transaction. The method may also include demultiplexing the multiplexed transaction after the multiplexed transaction is executed.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
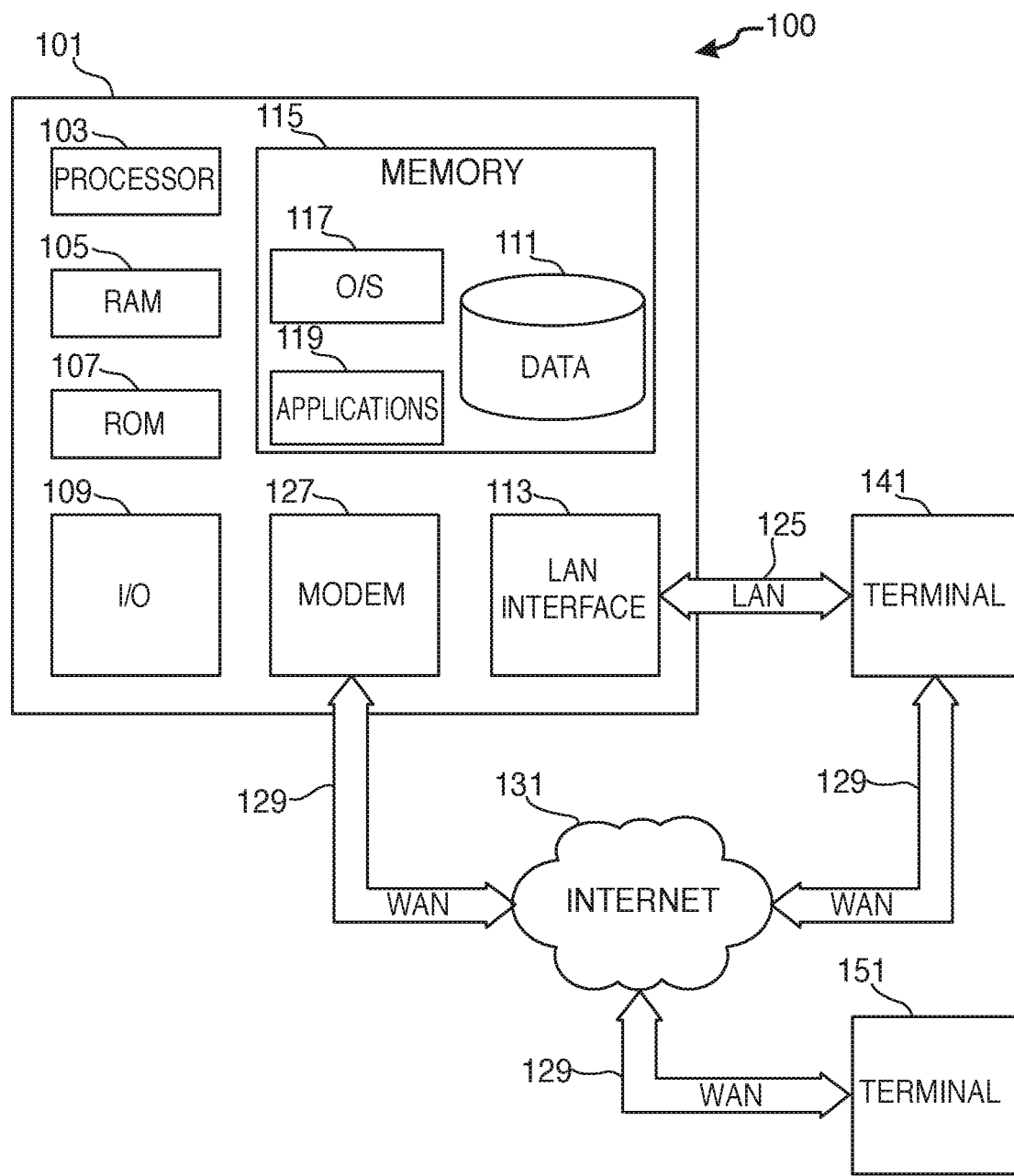
FIG. 1 shows an illustrative system in accordance with principles of the disclosure.

A method is provided for batch multiplexing a plurality of transactions. The method may include receiving an instruction to execute a first transaction. The method may include deriving for the first transaction, via a processing engine, an incentive value for each of a plurality of pending transaction queues. Each pending transaction queue may be associated with a unique maximum time window. A maximum time window may be a window of time within which a transaction is guaranteed to be executed. The incentive value may be a value—such as a reduction in processing fees—derived to compensate for an authorization to delay the transaction for the duration of the maximum time window.

Deriving the incentive value for a pending transaction queue may be based at least in part on various factors. The factors may include those that impact resource utilization and costs associated with processing and/or executing the first transaction—including factors that may affect the resource utilization and costs when combining the first transaction with other transactions. Exemplary factors may include a size of the first transaction, a number and/or size of other transactions that are in the pending transaction queue, and a number and/or size of other transactions that are expected to join the pending transaction queue based on predictive analytics.

The predictive analytics may be performed via a machine-learning ("ML") component of the processing engine. The ML component may utilize historical data and/or real-time information to perform the predictive analytics. For example, the historical data may include records of received transactions. The processing engine may derive patterns to predict the number and/or size of expected transactions. The prediction may depend on certain events, and the processing engine may be configured to determine the occurrence of the events through monitoring of electronic news sources and media.

The method may include receiving an authorization to delay the first transaction via a graphical user interface ("GUI") of a computing device associated with a sender of the transaction instruction. The method may also include receiving a selection of one of the pending transaction queues via the GUI.

The method may also include applying the incentive value derived for the selected pending transaction queue to the first transaction and/or to the sender of the first transaction. The method may further include appending the first transaction to the selected pending transaction queue.

The method may also include combining, prior to the termination of the maximum time window of the selected pending transaction queue, the transactions in the selected pending transaction queue. Combining the transactions may create a single multiplexed transaction. The method may further include executing the multiplexed transaction. The method may also include demultiplexing the multiplexed transaction after the multiplexed transaction is executed.

Some embodiments of the method may include dynamic adjustment. For example, when an additional instruction is received to execute another transaction, the method may include dynamically adjusting the incentive value derived for the first transaction for each of the pending transaction queues. The incentive values may, in certain embodiments, be adjusted when the additional instruction is unexpected, and does not conform to the expected pattern predicted by the processing engine. In this scenario, the method may also include configuring the GUI to display the adjusted values. Displaying the adjusted values may facilitate receiving an updated selection of a pending transaction queue, with its associated maximum time window.

Some embodiments of the method may include configuring the GUI to display various options of parameters including time windows and incentive values. Displaying the various parameter options may enable receiving a selection of a pending transaction queue for the transaction.

The displayed options may, in certain embodiments, be graphical. For example, the method may include augmenting the GUI to display a graph with a time axis and an incentive axis. The plurality of maximum time windows may be displayed along the time axis, and the incentive values may be displayed along the incentive axis. The plotted time windows and incentive values may form a line on the graph. The line may show the possible sets of parameters (i.e., time window/incentive value pairs) that are available for selection for the transaction.

The method may include receiving a selection, via the GUI, of one of the maximum time windows, which may thereby dictate the selection of one of the pending transaction queues—namely, the pending transaction queue associated with the selected maximum time window. The method may further include fixing the incentive value based on the selected maximum time window.

Some embodiments of the method may include receiving, via the GUI, a selection of a set of maximum time windows. The set may represent a range of authorized time windows. The method may further include selecting, via the ML component, one maximum time window from the set to use with the transaction. The selecting may be based at least in part on a calculation of which time window may produce the maximum reduction in transaction overhead. The selection may contribute to the selection of one of the pending transaction queues for appending the transaction.

Some embodiments of the method may include another parameter—maximum transaction fluctuation—aside from maximum time window and incentive value. The maximum transaction fluctuation parameter may account for a variability in the transaction that may occur when the transaction is delayed. For example, the terms of a purchase or a stock or foreign currency transaction may change over time from the terms at the time of the instruction to execute the transaction. The method may then include deriving multiple incentive values for each pending transaction queue. The multiple incentive values may be mapped to multiple maximum transaction fluctuations.

The method may also include displaying a separate graph on the GUI for each of the multiple maximum transaction fluctuations. Alternatively, the GUI may display a separate graph for each maximum time window, and the axes of the graph may show incentive and fluctuation. The GUI may also be configured to toggle between displaying any two out of the three parameters. Alternatively, the GUI may be configured to display a three-dimensional graph showing all three parameters at once. In this configuration, the parameters available for selection may be displayed in planar form.

A system for batch multiplexing a plurality of transactions is provided. The system may include a processing module configured to derive one or more sets of delay parameters for a first transaction. Each set of delay parameters may include a maximum time window and an incentive value.

The system may also include a computing device associated with a sender of the first transaction. The computing device may include a graphical user interface ("GUI"). The GUI may be configured to display the sets of delay parameters. The GUI may also be configured to capture an authorization to delay the first transaction, and a selected set of delay parameters from the sets of delay parameters.

The processing module may be further configured to apply the incentive value of the selected set of delay parameters to the first transaction. The processing module may also be configured to combine, within the maximum time window of the selected set of delay parameters, the first transaction with one or more other transactions in order to form a single multiplexed transaction. The other transactions may, in some embodiments, be selected from a pool of pending transactions. The other transactions may be transactions that are of the same, or similar, category as the first transaction. For example, the transactions may all be currency trades, or, preferably, currency trades of the same currencies. Another example may be stock trades, purchases, or any other suitable transactions in which multiple individual transactions can be combined into a single, larger, transaction.

The processing module may further be configured to execute the multiplexed transaction. The multiplexed transaction may be a combined transaction that can be executed as a single transaction. The multiplexed transaction may be associated with reduced resource utilization or costs than the sum of the resource utilization or costs of the constituent transactions.

The processing module may further be configured to demultiplex the multiplexed transaction after the multiplexed transaction is executed. Demultiplexing the transaction may involve parsing, separating, and/or distributing the results of the multiplexed transaction—e.g., received currency, purchased items, etc.—according to the individual transactions that constituted the multiplexed transaction.

In some embodiments of the system, the processing module may include a machine-learning ("ML") module. The processing module may be further configured to derive the incentive value of each set of delay parameters based at least in part on the maximum time window of the set of delay parameters, a time of an instruction to execute the first transaction, a size of the first transaction, a record of historical transactions, and/or any other suitable factor.

In certain embodiments, the GUI may be further configured to display a graph. The graph may include a time axis and an incentive axis. The sets of delay parameters may be plotted on the graph. In some embodiments, the maximum time windows of the sets of delay parameters may be continuous along the time axis of the graph.

In some embodiments of the system, the GUI may be further configured to capture multiple selected sets of delay parameters from the sets of delay parameters. The processing module may be further configured to select one set of delay parameters from the multiple selected sets of delay parameters, based at least in part on information about other transactions received by, and/or projected to be received by, the system.

In certain embodiments of the system, each set of delay parameters may further include a maximum transaction fluctuation. The GUI may be further configured to display a separate graph for each of multiple maximum transaction fluctuation options.

Some embodiments of the system may include multiple queues of pending transactions. Each queue may be associated with a different maximum time window. The processing module may be further configured to derive a separate set of delay parameters for each queue, append the first transaction to a particular queue based on the selected set of delay parameters, and form the multiplexed transaction by combining all the transactions in the particular queue.

A method for batch multiplexing a plurality of transactions is provided. The method may include receiving an instruction from a sender to execute a first transaction. The method may also include generating delay parameters for the first transaction. The delay parameters may include a maximum time window and an incentive value. The incentive value may be derived via a machine-learning ("ML") module based at least in part on the maximum time window, a time of the instruction, a size of the first transaction, and a record of historical transactions.

The method may include receiving an authorization from the sender to delay the first transaction, and applying the incentive value to the first transaction. The method may also include combining, within the maximum time window, the first transaction with one or more other transactions in order to form a single multiplexed transaction. The method may further include executing the multiplexed transaction, and demultiplexing the multiplexed transaction after the multiplexed transaction is executed.

In some embodiments, the method may also include displaying one or more delay parameter options, and a selectable option to authorize a delay for the first transaction. The displaying may be on a computing device associated with the sender of the first transaction.

In certain embodiments of the method, the displaying the delay parameter options may further include augmenting a graphical user interface ("GUI") of the computing device to display a graph with a time axis and an incentive axis. The method may further include deriving, via the ML module, a separate incentive value for each of multiple maximum time window options.

The method may also include displaying the multiple maximum time window options along the time axis, and the incentive values along the incentive axis. In some embodiments, the maximum time window options may be continuous along the time axis. The method may also include selecting the delay parameters from the delay parameter options. The selecting may include receiving a selection, via the GUI, of a maximum time window option, and fixing the incentive value based on the selected maximum time window option.

The method may, in some embodiments, include receiving, via the GUI, a selection of multiple delay parameters from the delay parameter options. The method may further include selecting, via the ML module, a single set of delay parameters from the multiple delay parameters, based at least in part on data about other transactions.

In some embodiments of the method, the delay parameters may further include a maximum transaction fluctuation. The method may further include displaying a separate graph on the GUI for each of multiple maximum transaction fluctuation options.

The method may, in certain embodiments, further include creating multiple queues of pending transactions. Each queue may be associated with a different maximum time window. The method may further include deriving a separate set of delay parameters for each queue, appending the first transaction to a particular queue based on the selected set of delay parameters, and forming the multiplexed transaction by combining all the transactions in the particular queue.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to transaction processing. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to transaction processing.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
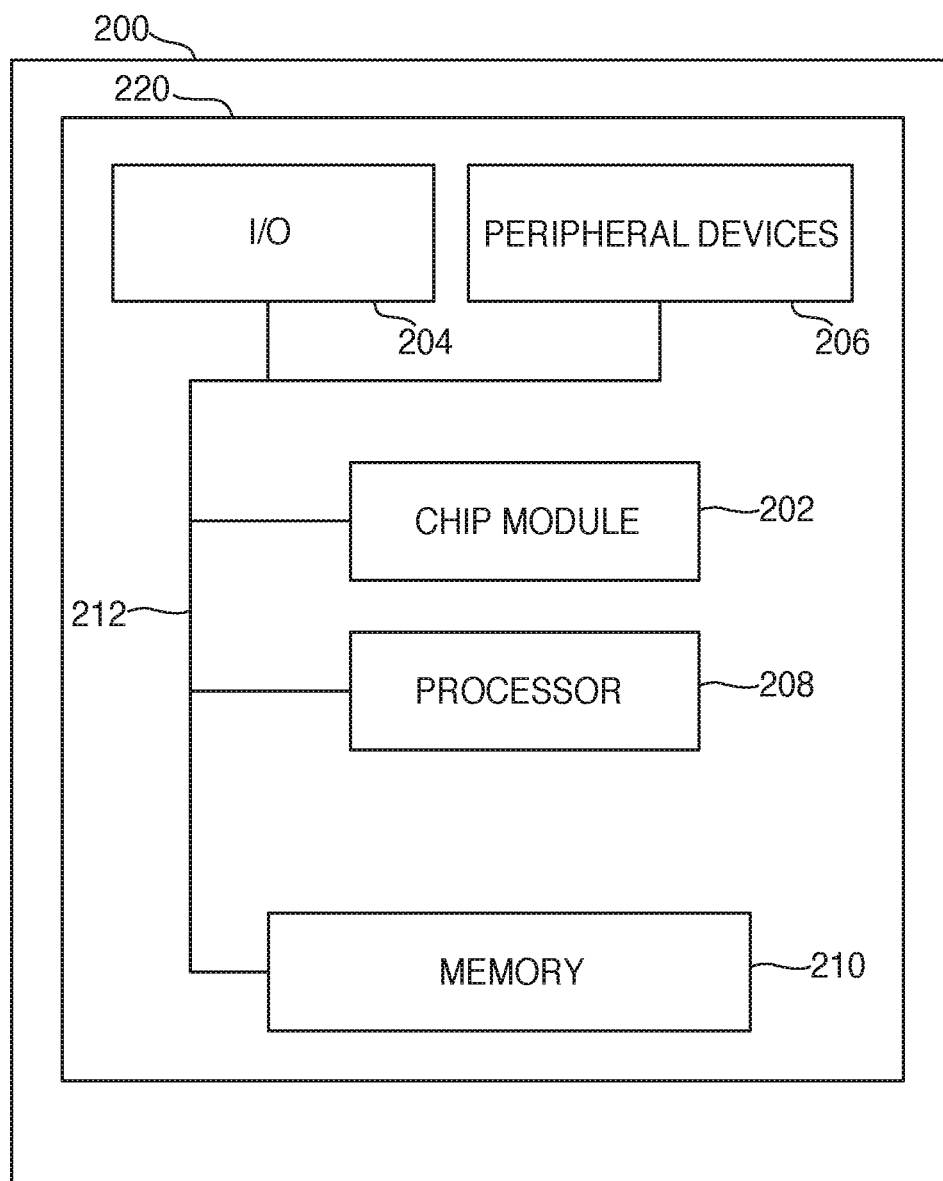
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
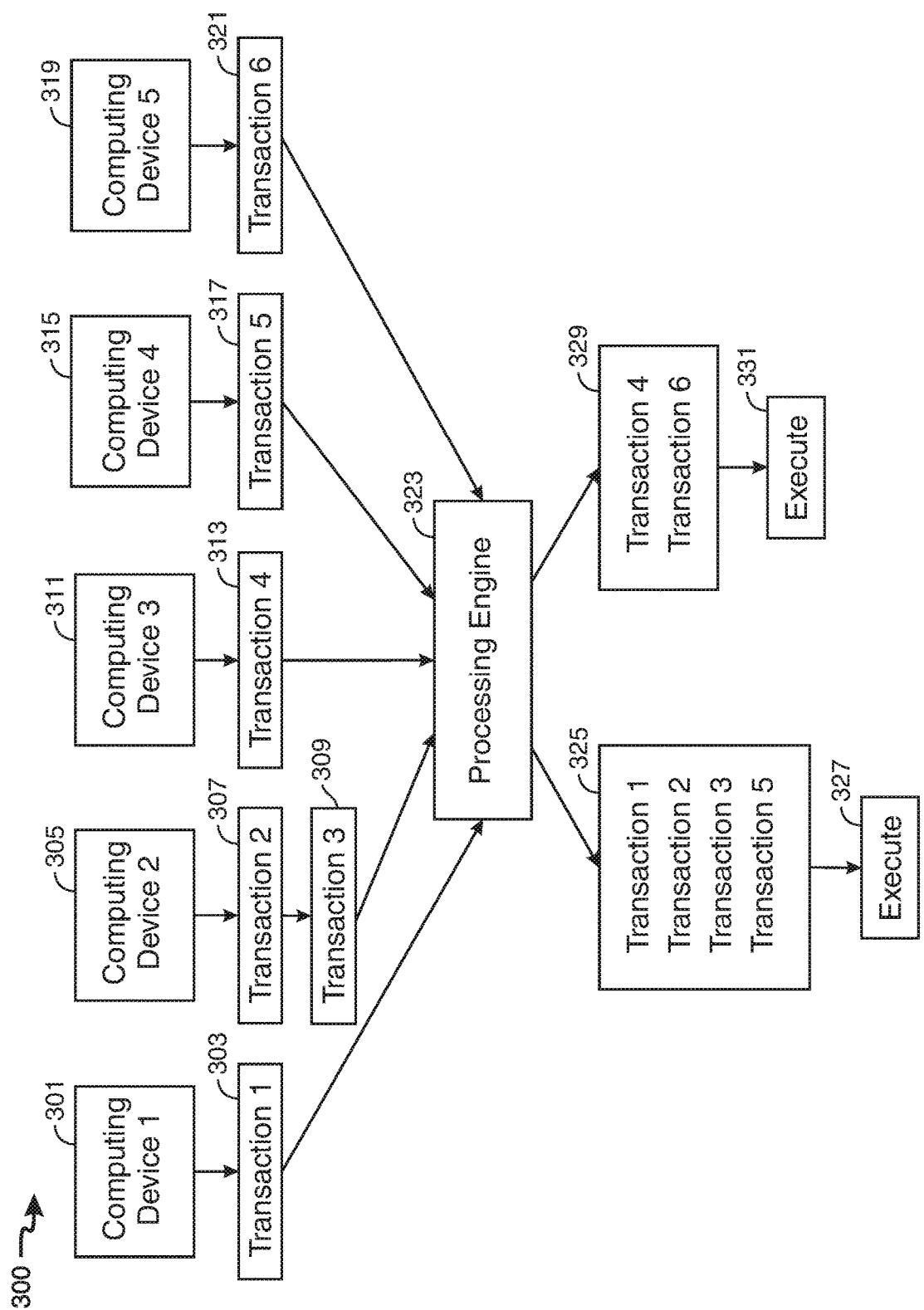
FIG. 3 shows an illustrative diagram in accordance with principles of the disclosure.

FIG. 3 shows illustrative diagram 300 in accordance with principles of the disclosure. Diagram 300 shows an exemplary high-level system architecture for batch multiplexing a plurality of transactions.

Diagram 300 shows a plurality of computing devices (301, 305, 311, 315, and 319). Computing device 1 (301) may send instructions to processing engine 323 to execute transaction #1 (303). Computing device 2 (305) may send instructions to execute transaction #2 (307) and transaction #3 (309). Computing device 3 (311) may send instructions to execute transaction #4 (313). Computing device 4 (315) may send instructions to execute transaction #5 (317), and Computing device 5 (311) may send instructions to execute transaction #6 (321).

Processing engine 323 may analyze the transactions and derive delay parameters (i.e., maximum time window, incentive value, and/or maximum transaction fluctuation) for each transaction. The delay parameters for each transaction may be displayed on the respective computing devices, and selections may be received. Based on the selections, processing engine 323 may append the transaction to appropriate pending transaction queues, each associated with a maximum time window.

Prior to the maximum time window of each respective pending transaction queue, the transactions in the queue may be combined to form a multiplexed transaction. For example, transaction #1 (303), transaction #2 (307), transaction #3 (309), and transaction #5 (317) may be combined to form multiplexed transaction 325, which may be executed, 327, as one transaction. Similarly, transaction #4 (313), and transaction #6 (321) may be combined to form multiplexed transaction 329, which may be executed, 331, as a single transaction.

Figure 4:
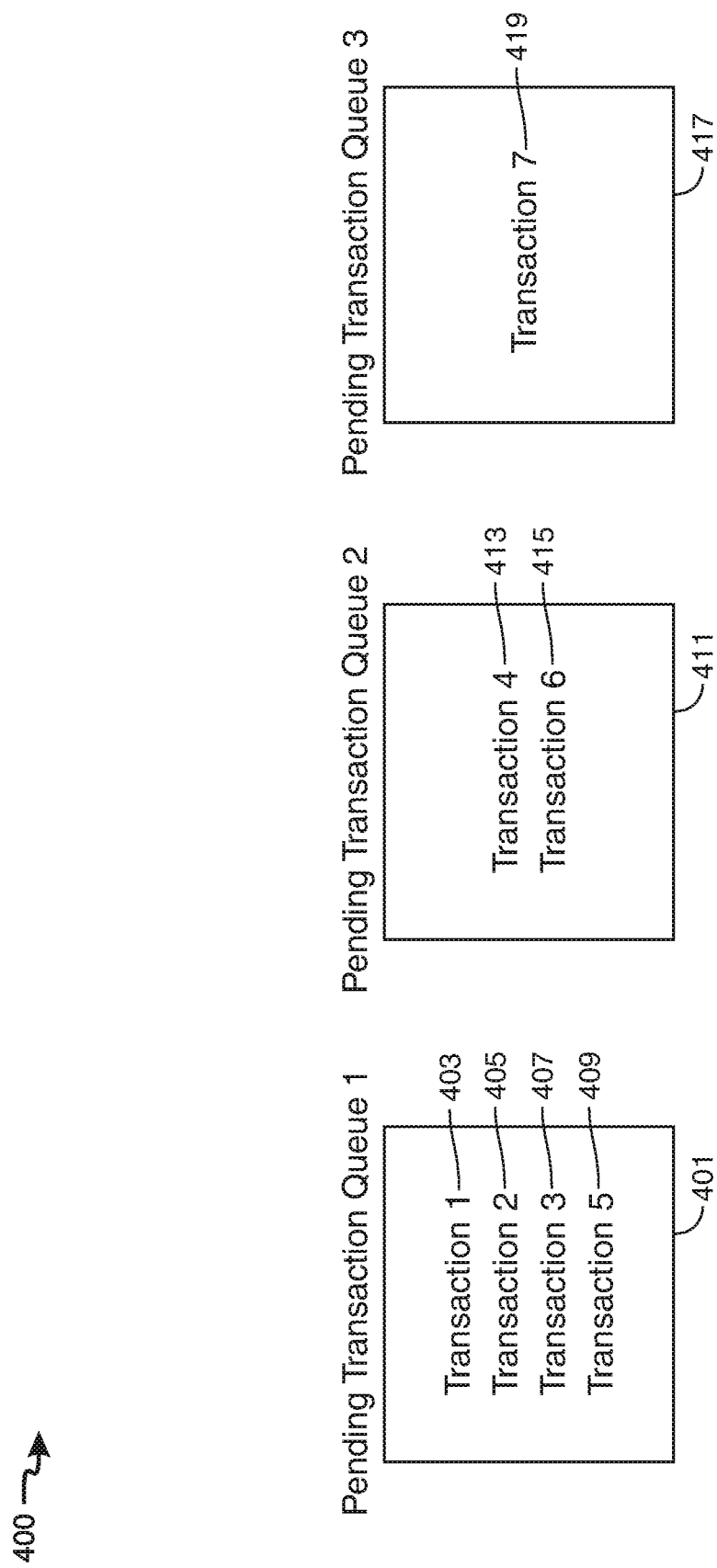
FIG. 4 shows another illustrative diagram in accordance with principles of the disclosure.

FIG. 4 shows illustrative diagram 400 in accordance with principles of the disclosure. Diagram 400 shows a plurality of pending transaction queues (401, 411, and 417). Pending transaction queue 401 may contain transactions 403-409. Pending transaction queue 411 may contain transactions 413 and 415. Pending transaction queue 417 may contain transaction 419.

In some embodiments, each pending transaction queue may be associated with a set time interval. For example, pending transaction queue 401 may have a maximum time window that ends at 1:00, pending transaction queue 411 may have a maximum time window that ends at 2:00, pending transaction queue 417 may have a maximum time window that ends at 3:00, etc. 1:00, 2:00, and 3:00 may be months, days, hours, minutes, seconds, fractions of a second, or any other suitable time interval for grouping pending transactions. In some embodiments, successive pending transaction queues may be substantially continuous.

Each pending transaction queue may be implemented with its own data structure. In some embodiments, the pending transaction queues may represent logical groupings and may not be implemented with separate data structures.

In certain embodiments, multiple pending transaction queues may exist simultaneously. In other embodiments, only one pending transaction queue may exist at a time. For example, for the interval between time 1:00 and 2:00 (the interval may be an hour, minute, day, etc.) every incoming transaction may generate an incentive value to authorize delaying execution until at most 2:00. As time approaches 2:00, the incentive values may decrease. At or before 2:00 the transactions in the queue may be multiplexed and executed, and a new queue may be initiated. The new queue may be for the interval between time 2:00 and 3:00. The interval for the queue may also differ for each queue, and may be generated by the processing engine depending on factors that may affect the reduction of processing utilization or costs. The factors may include size and/or expectancy of other transactions.

Figure 5:
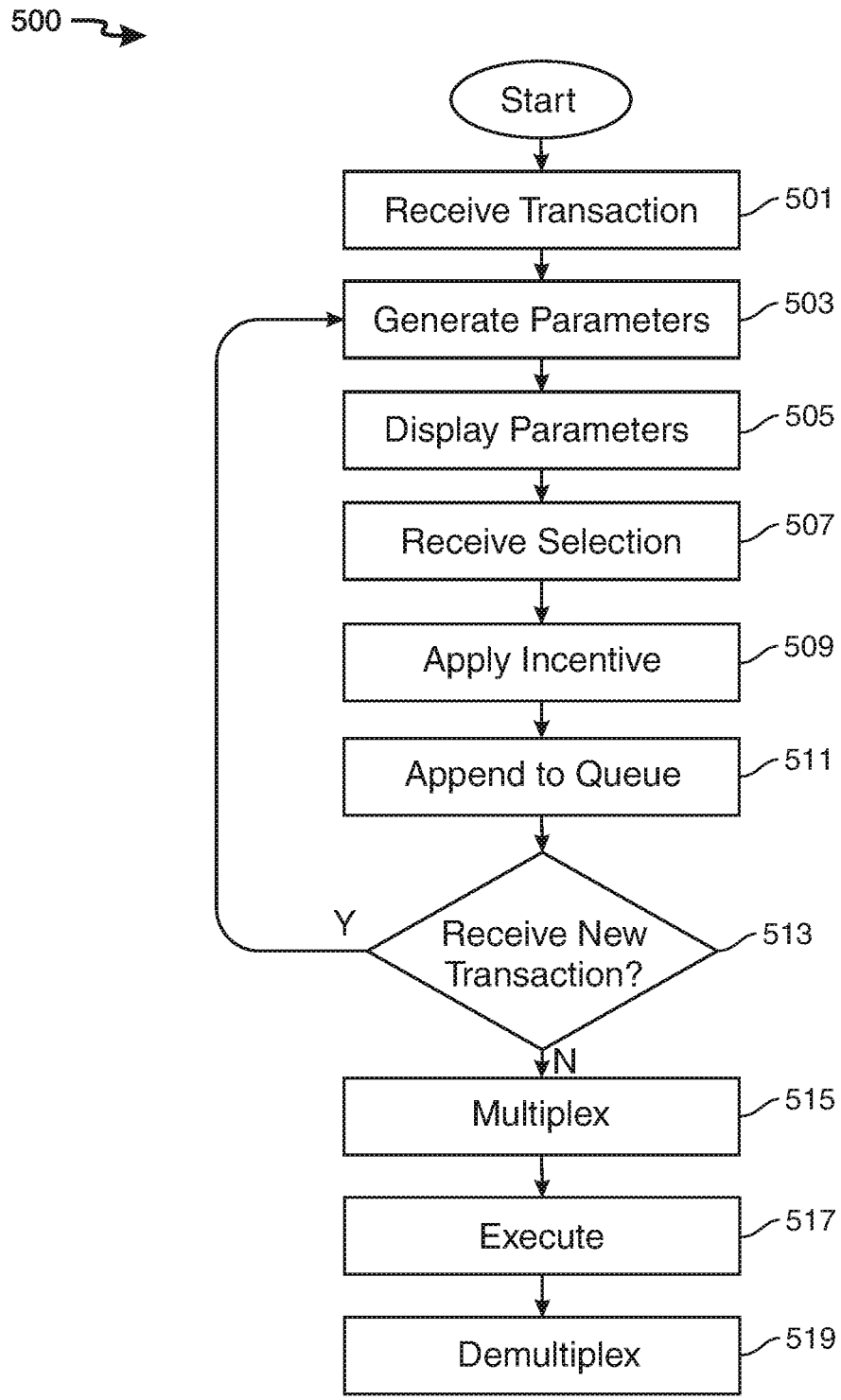
FIG. 5 shows an illustrative flowchart in accordance with principles of the disclosure.

FIG. 5 shows illustrative flowchart 500 in accordance with principles of the disclosure. Flowchart 500 represents one exemplary logical process for batch multiplexing a plurality of transactions. Other processes in accordance with principles of the disclosure may omit steps, replace steps, add steps, and/or include different step sequences than those shown in flowchart 500.

At step 501, a system may receive a transaction. At step 503, a processing engine may generate delay parameters for the transaction. At step 505, the delay parameters may be displayed, e.g., via a GUI of a computing device. At step 507, the system may receive a selection of certain parameters. The certain parameters may include a time window, an incentive value, and/or a fluctuation range. The certain parameters may be associated with a particular pending transaction queue.

At step 509, the system may apply the incentive value to the transaction. For example, the transaction may be associated with discounted processing fees. At step 511, the transaction may be appended, or added, to the particular pending transaction queue.

At step 513, if the system has received a new transaction (within the maximum time window), the system may revert to step 503 and generate new parameters. Generating new parameters may trigger another loop through steps 505-511. The loop may be an adjustment to the previous iteration—i.e., the new parameters may be displayed at 505, new parameters may be selected at 507, an adjusted incentive may be applied at 509, and the transaction may be appended to a different queue at 511.

If the system has not received a new transaction at step 513, the system may, at step 515, multiplex the transactions in the pending transaction queue within the maximum time window. At step 517 the system may execute the multiplexed transaction. At step 519, the system may demultiplex the multiplexed transaction.

Figure 6:
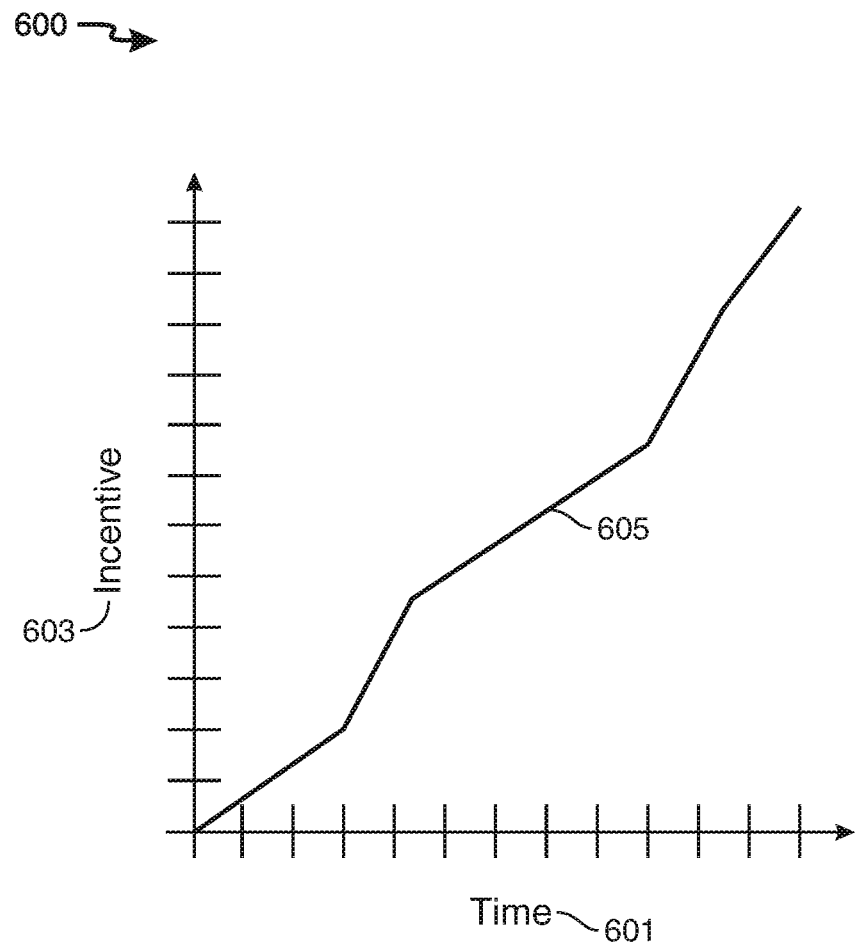
FIG. 6 shows an illustrative graph in accordance with principles of the disclosure.

FIG. 6 shows illustrative graph 600 in accordance with principles of the disclosure. Graph 600 may be one exemplary graph similar to one that may display delay parameter options on a GUI of a computing device. Any other suitable graphical display may also be used.

Graph 600 may include time axis 601 and incentive axis 603. Plot 605 may show the parameter sets (e.g., time/incentive pairs) that were generated for a transaction. In some embodiments (shown), plot 605 may be a continuous line. In these embodiments, every point of time along the time axis may be associated with an incentive value. In other embodiments (not shown), plot 605 may include discrete points. The discrete points may represent the maximum time windows of discrete pending transaction queues, plotted according to their respective incentive values.

Graph 600 may include features for selecting parameters. For example, graph 600 may be configured to register a mouse click or touchscreen tap on plot 605, or along one or both of the axes, to select a parameter set. In other embodiments, graph 600 may include a sliding feature that may be dragged along plot 605, or along one or both of the axes, to select a parameter set. Graph 600 may also include any other suitable feature for selecting parameters.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a batch transaction multiplexing engine are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for batch multiplexing a plurality of transactions, the method comprising:
    receiving, at a processing engine, an instruction to execute a first transaction;
    deriving for the first transaction, via the processing engine, delay parameters including an incentive value for each of a plurality of pending transaction queues, each pending transaction queue associated with one of a plurality of maximum time windows, wherein deriving the incentive value for a pending transaction queue is based at least in part on:
        a size of the first transaction;
        a number and/or size of other transactions that are in the pending transaction queue; and
        a number and/or size of other transactions that are expected to join the pending transaction queue based on predictive analytics, said predictive analytics performed via a machine-learning ("ML") component of the processing engine;
    receiving, via a graphical user interface ("GUI") of a computing device associated with a sender of the instruction:
        an authorization to delay the first transaction; and
        a selection of one of the pending transaction queues;
    applying the incentive value derived for the selected pending transaction queue to the first transaction;
    appending the first transaction to the selected pending transaction queue;
    combining, prior to the termination of the maximum time window of the selected pending transaction queue, the transactions in the selected pending transaction queue, said combining to create a single multiplexed transaction;
    executing the multiplexed transaction; and
    demultiplexing the multiplexed transaction after the multiplexed transaction is executed.

2. The method of claim 1, further comprising, when another instruction is received to execute another transaction:
    dynamically adjusting the incentive value derived for each of the pending transaction queues; and
    configuring the GUI to receive an updated selection of a pending transaction queue.

3. The method of claim 1, further comprising:
    augmenting the GUI to display a graph with a time axis and an incentive axis;
    displaying the plurality of maximum time windows along the time axis;
    displaying the incentive values along the incentive axis;
    receiving a selection, via the GUI, of one of the maximum time windows, which thereby comprises the selection of one of the pending transaction queues; and
    fixing the incentive value based on the selected maximum time window.

4. The method of claim 3, further comprising:
    receiving, via the GUI, a selection of a set of maximum time windows; and
    selecting, via the ML component, one of the set as part of the selection of one of the pending transaction queues.

5. The method of claim 3, further comprising:
    deriving a plurality of incentive values for each pending transaction queue, the plurality of incentive values mapped to a plurality of maximum transaction fluctuations; and
    displaying a separate graph on the GUI for each of the plurality of maximum transaction fluctuations.

6. A system for batch multiplexing a plurality of transactions, the system comprising:
    a processing module configured to derive one or more sets of delay parameters for a first transaction, each set of delay parameters comprising a maximum time window and an incentive value; and
    a computing device associated with a sender of the first transaction, said computing device comprising a graphical user interface ("GUI") configured to:
        display the sets of delay parameters; and
        capture:
            an authorization to delay the first transaction; and
            a selected set of delay parameters from the sets of delay parameters;
    wherein the processing module is further configured to:
        apply the incentive value of the selected set of delay parameters to the first transaction;
        combine, within the maximum time window of the selected set of delay parameters, the first transaction with one or more other transactions in order to form a single multiplexed transaction; and
        execute the multiplexed transaction;
    wherein:
        the processing module comprises a machine-learning ("ML") module, and the processing module is further configured to derive the incentive value of each set of delay parameters based at least in part on the maximum time window of said set of delay parameters, a time of an instruction to execute the first transaction, a size of the first transaction and a record of historical transactions.

7. The system of claim 6, wherein the GUI is further configured to:
    display a graph, said graph comprising a time axis and an incentive axis; and
    plot the sets of delay parameters on the graph.

8. The system of claim 7, wherein the maximum time windows of the sets of delay parameters are continuous along the time axis.

9. The system of claim 7, wherein:
    the GUI is further configured to capture a plurality of selected sets of delay parameters from the sets of delay parameters; and
    the processing module is further configured to select one set of delay parameters from the plurality of selected sets of delay parameters, based at least in part on the other transactions.

10. The system of claim 7, wherein each set of delay parameters further comprises a maximum transaction fluctuation, and the GUI is further configured to display a separate graph for each of a plurality of maximum transaction fluctuation options.

11. The system of claim 6, wherein the processing module is further configured to:
   demultiplex the multiplexed transaction after the multiplexed transaction is executed.

12. The system of claim 6, further comprising a plurality of queues of pending transactions, each queue associated with a different maximum time window, and the processing module is further configured to:
   derive a separate set of delay parameters for each queue;
   append the first transaction to a particular queue based on the selected set of delay parameters; and
   form the multiplexed transaction by combining all the transactions in the particular queue.

13. A method for batch multiplexing a plurality of transactions, the method comprising:
   receiving, at a processing engine, an instruction from a sender to execute a first transaction;
   generating, via the processing engine, delay parameters for the first transaction, said delay parameters comprising a maximum time window and an incentive value, wherein the incentive value is derived via a machine-learning ("ML") module based at least in part on the maximum time window, a time of the instruction, a size of the first transaction, and a record of historical transactions;
   receiving an authorization from the sender to delay the first transaction;
   applying the incentive value to the first transaction;
   combining, within the maximum time window, the first transaction with one or more other transactions in order to form a single multiplexed transaction;
   executing the multiplexed transaction; and
   demultiplexing the multiplexed transaction after the multiplexed transaction is executed.

14. The method of claim 13, further displaying, on a computing device associated with the sender:
   one or more delay parameter options; and
   a selectable option to authorize a delay for the first transaction.

15. The method of claim 14, wherein:
   the displaying the delay parameter options further comprises augmenting a graphical user interface ("GUI") of the computing device to display a graph with a time axis and an incentive axis, and the method further comprises:
   displaying a plurality of maximum time window options along the time axis;
   deriving, via the ML module, a separate incentive value for each of the maximum time window options;
   displaying the incentive values along the incentive axis; and
   selecting the delay parameters from the delay parameter options, said selecting comprising:
      receiving a selection, via the GUI, of a maximum time window option; and
      fixing the incentive value based on the selected maximum time window option.

16. The method of claim 15, wherein the plurality of maximum time window options are continuous along the time axis.

17. The method of claim 15, further comprising:
   receiving, via the GUI, a selection of a plurality of delay parameters from the delay parameter options; and
   selecting, via the ML module, the delay parameters from the plurality of delay parameters, based at least in part on the other transactions.

18. The method of claim 15, wherein the delay parameters further comprise a maximum transaction fluctuation, and the method further comprises displaying a separate graph on the GUI for each of a plurality of maximum transaction fluctuation options.

19. The method of claim 13, further comprising:
   creating a plurality of queues of pending transactions, each queue associated with a different maximum time window;
   deriving a separate set of delay parameters for each queue;
   appending the first transaction to a particular queue based on the selected set of delay parameters; and
   forming the multiplexed transaction by combining all the transactions in the particular queue.

* * * * *